(12) United States Patent
Shah et al.

(10) Patent No.: US 7,489,062 B2
(45) Date of Patent: Feb. 10, 2009

(54) SYNCHRONOUS RELUCTANCE MACHINE WITH A NOVEL ROTOR TOPOLOGY

(75) Inventors: Manoj Ramprasad Shah, Latham, NY (US); Jeremy Daniel VanDam, W. Coxsackie, NY (US); William Dwight Gerstler, Niskayuna, NY (US); Ronghai Qu, Clifton Park, NY (US); Ralph James Carl, Jr., Clifton Park, NY (US)

(73) Assignee: General Electric Company, Nishkayuna, NY (US)

( * ) Notice: Subject to any disclaimer, the term of this patent is extended or adjusted under 35 U.S.C. 154(b) by 149 days.

(21) Appl. No.: 11/272,848

(22) Filed: Nov. 14, 2005

(65) Prior Publication Data

US 2007/0108853 A1    May 17, 2007

(51) Int. Cl.
*H02K 1/22* (2006.01)
*H02K 1/32* (2006.01)
*H02K 19/00* (2006.01)

(52) U.S. Cl. ............... 310/216; 310/60 A; 310/156.08; 310/217; 310/218

(58) Field of Classification Search ......... 310/216–218, 310/261, 58–61, 60 A, 64–65, 156.05, 156.53, 310/156.56
See application file for complete search history.

(56) References Cited

U.S. PATENT DOCUMENTS

| | | | | |
|---|---|---|---|---|
| 4,128,778 A | * | 12/1978 | Merkle et al. | 310/67 R |
| 4,209,721 A | * | 6/1980 | Feldle et al. | 310/67 R |
| 4,924,130 A | * | 5/1990 | Fratta | 310/261 |
| 5,010,267 A | * | 4/1991 | Lipo et al. | 310/162 |
| 5,296,773 A | * | 3/1994 | El-Antably et al. | 310/261 |
| 5,801,478 A | * | 9/1998 | Nashiki | 310/261 |
| 6,225,724 B1 | * | 5/2001 | Toide et al. | 310/216 |
| 6,849,983 B2 | * | 2/2005 | Tajima et al. | 310/166 |
| 2003/0048030 A1 | * | 3/2003 | Griffith et al. | 310/254 |
| 2005/0077801 A1 | | 4/2005 | Han et al. | 310/266 |

* cited by examiner

*Primary Examiner*—Tran N Nguyen
(74) *Attorney, Agent, or Firm*—Penny A. Clarke

(57) ABSTRACT

A synchronous reluctance machine that has a stator and a rotor shaft operationally disposed within the confines of the stator. Laminations are axially stacked to form boat shaped segments. A plurality of selected boat shaped segments form a selected number of rotor poles about the rotor shaft and a plurality of support bars disposed intermittently between the boat shaped segments. Each segment of lamination is boat shaped with angular acuity facing towards the stator.

18 Claims, 7 Drawing Sheets

SYNCHRONOUS RELUCTANCE MACHINE WITH A NOVEL ROTOR TOPOLOGY

BACKGROUND OF THE INVENTION

A synchronous machine has a stator and a rotor supported in the inner periphery of the stator, is capable of being locally excited and is structurally the same as the stator of a common induction machine. Generally, the synchronous reluctance machine is well known as a motor, which is simply structured and does not need electric current channels or permanent magnets in the rotor. For example, the conventional induction machine comprises a machine body serving as a casing, a stator arranged along an inner circumferential surface of the machine body and an AC squirrel cage rotor rotatably arranged based on a rotational shaft at the center of the stator. The stator is formed of a lamination structure of a plurality of silicon steel and is provided with a plurality of teeth therein. A plurality of slots are formed between the teeth with a certain interval and the coil is wound on the teeth through the slots.

The synchronous reluctance rotor generally includes a plurality of rotor sections formed of alternating magnetic and non-magnetic laminations secured to a unitary core. The core has a central axial bore for receiving a shaft. The laminations are inserted between radially extending arms of the core that are formed with a smooth, arcuate recess therebetween. The laminations are secured in the recesses by means of radial fasteners that secure radially opposing rotor sections to the core. The rotor sections are also secured together by end caps and radial fasteners. The end caps are cup-shaped members with an axially extending outer rim that is disposed about the outermost periphery of the laminations. The radial fasteners extend through the end caps and core to secure the end caps to the rotor. The rotor laminations may also be bonded to one with another and to the core using an epoxy or other adhesive material.

Existing synchronous reluctance machines are mechanically and thermally limited due to the use of "boat" shaped laminations, stacked radially for the rotor. Traditionally, the synchronous reluctance machines have a rotor shaft that has been machined to receive the boat shaped laminations stacked radially along the rotor shaft. The boat shaped lamination poles are then bolted to the rotor shaft. This construction limits the rotor dimensions for high-speed applications and inherently has significant core losses. Attempts in the past to remedy this problem have been to select alternate machine topology and not to address the problem directly.

BRIEF DESCRIPTION OF THE INVENTION

The disclosed technology is a synchronous reluctance machine that has stator and a rotor shaft operationally disposed within the confines of the stator. A plurality of selected boat shaped segments laminated axially forms a selected number of rotor poles about the rotor shaft. A network of support bars support the rotor pole segments radially. Each of the support bars is of sufficient size to carry the centripetal loading of the segments located radially within.

The above described and other features are exemplified by the following figures and detailed description.

BRIEF DESCRIPTION OF THE DRAWINGS

Referring now to the figures wherein the like elements are numbered alike.

DETAILED DESCRIPTION

Figure 1:
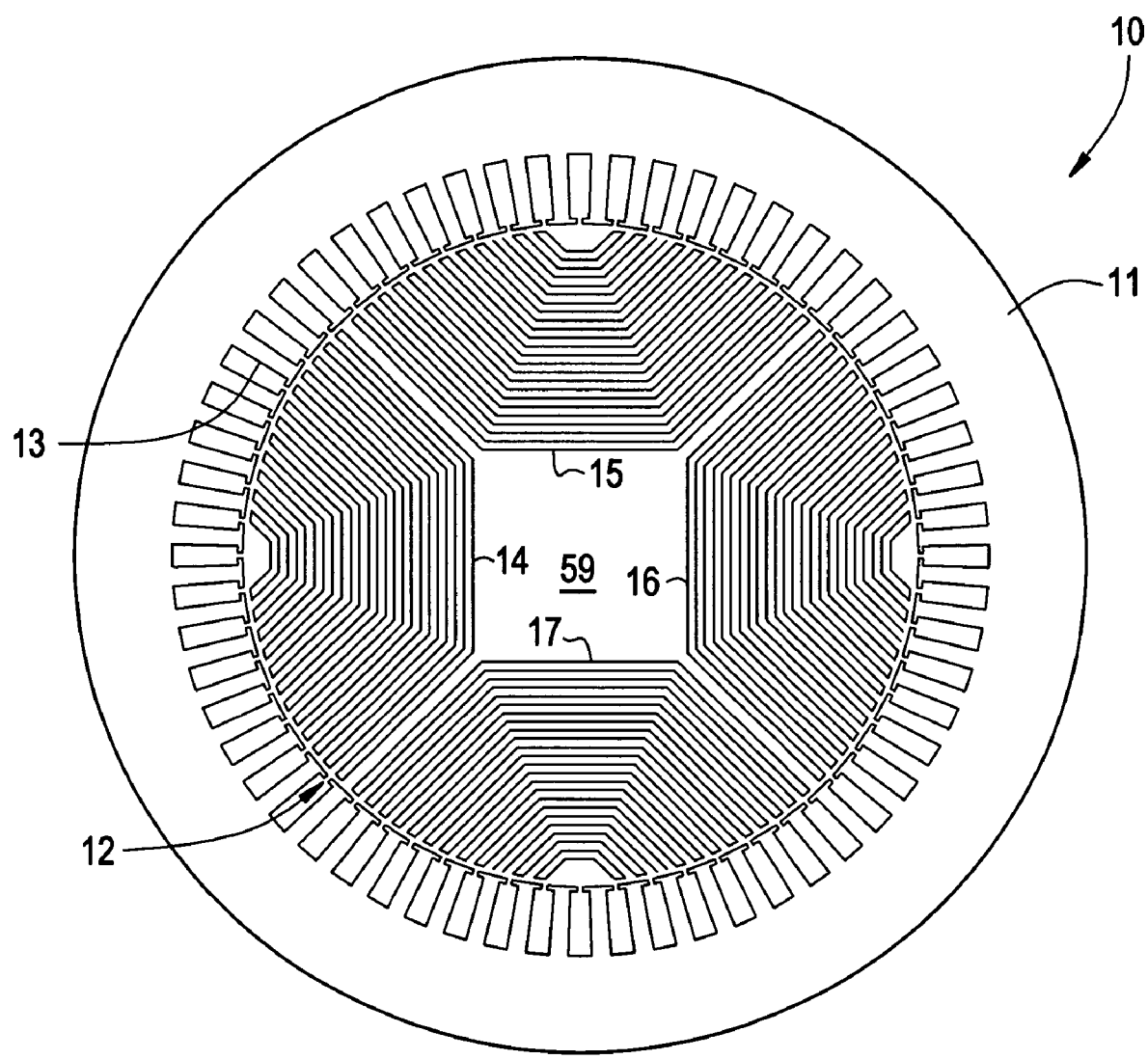
FIG. 1 illustrates an end view diagram of an exemplary embodiment of a synchronous reluctance machine.

The disclosed technology is a synchronous reluctance machine 10, FIG. 1 that has a selectively shaped rotor 12 and a stator 11. The stator 11 has a plurality of slots sized to receive armature windings. The selectively shaped rotor 12 of the synchronous reluctance machine 10 is configured in FIG. 1, as a four-pole machine 14, 15, 16 and 17. It is understood the synchronous reluctance machine 10 may, if desired, be configured with as many poles as desired. The configuration illustrated in FIG. 1, is for illustration purposes only. Each individual pole of the synchronous reluctance machine 10, FIG. 1, is of identical construction. For example, synchronous reluctance machine 10, FIG. 1, has four poles but for design reasons or performance requirements the synchronous reluctance machine may have six identical poles.

Figure 2:
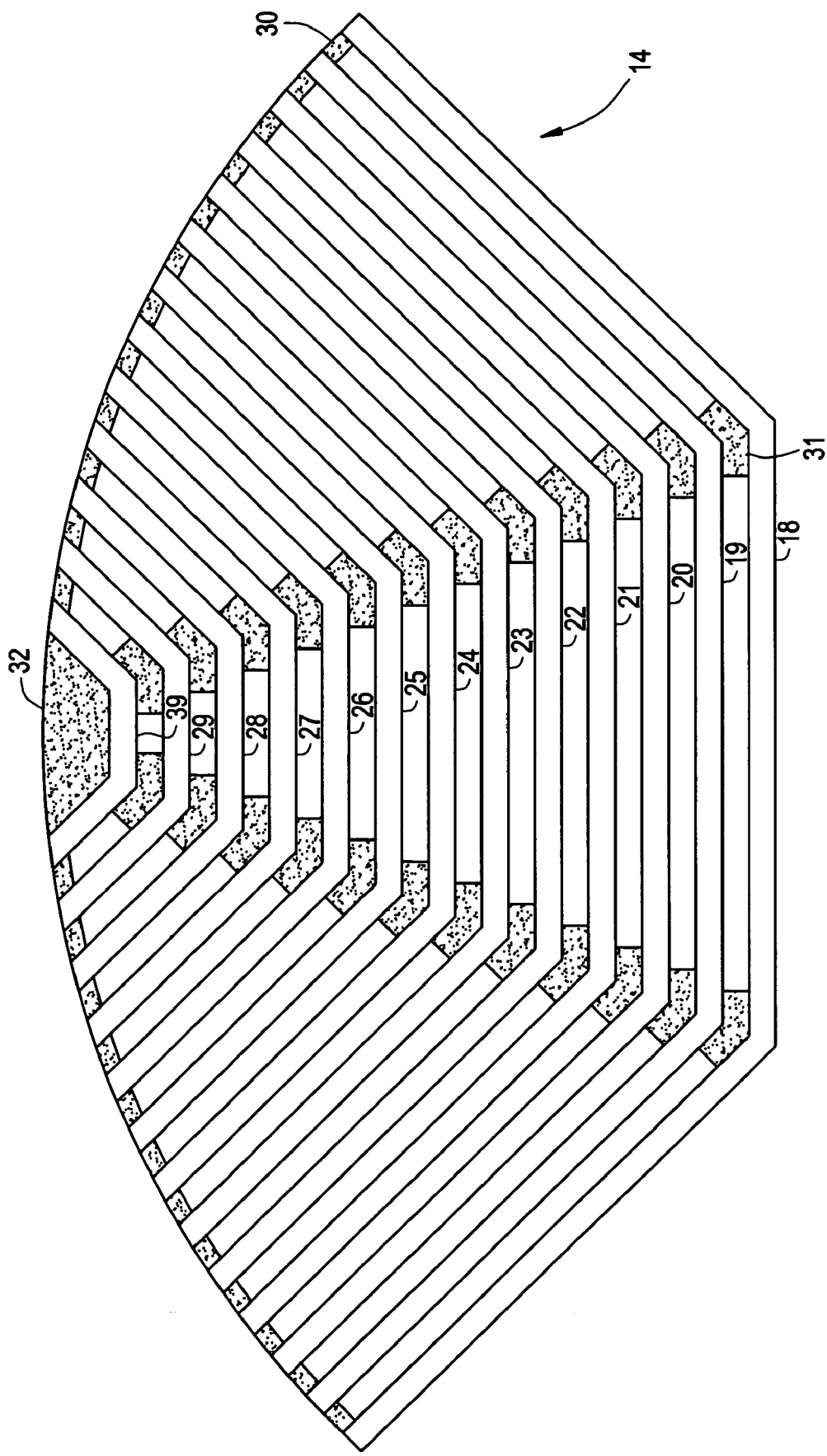
FIG. 2 illustrates an end view diagram of a pole of a rotor of FIG. 1.

The exemplary pole 14, FIG. 2, is constructed from a plurality of axially extending radially positioned boat shaped laminated segments 18, 19, 20, 21, 22, 23, 24, 25, 26, 27, 28, 29 and 39. The laminated segments 18 to 29 and 39 are only exemplary. The number of laminated segments may, if desired, be any number depending on the design criteria of the synchronous reluctance machine. The laminated segments 18 to 29 and 39 may, if desired, be silicon steel or any other convenient, preferably magnetic, material. The number of laminated segments 18 to 29 and 39 shown in the example is twelve but could be any other desired number. Each laminated segment is separated from the subsequent laminated segment by a spacer or end bar 30. The end bars 30 may, if desired, be any convenient shape or size to separate the laminated segments. Depending on the design criteria of the synchronous reluctance machine the end bars 30 may be of varying size within the rotor pole structure. For example, the end bars 30 of exemplary pole 14 are all the same size, have an elongated shape and traverse the axial length of each associated boat shaped structure. The end bars 30 are manufactured from any convenient non-ferromagnetic material that can offer high strength at elevated temperatures like Inconel, AM 350 or 17-4PH.

The laminated segments 18 to 29 and 39, FIG. 2, are sufficiently separated to receive a forced or non-forced cooling gas or fluid. Examples of a cooling gas are air, nitrogen or any other type of gas. The exemplary gas may, if desired, be refrigerated or super cooled. Alternate liquid coolants may also be considered if amenable to the operating environment. The rotor may operate at a temperature different than that of the stator. The temperature range over which the rotor may be operated need only be limited by the materials used in its construction. As the synchronous reluctance rotor topology does not require the use of temperature restricted materials such as copper or electrical insulation it may be operated across a broad range of temperatures.

Each of the axially extending radially positioned boat shaped laminated segments 18 to 29 and 39 have two angled portions to form a boat shape. The angled sections of each laminated segment 18 to 29 and 39 are separated from the subsequent angled section by an angled spacer bar 31. The angled spacer bar 31 may, if desired, have any convenient angle depending on the number of poles and the physical size of the synchronous reluctance machine 10. An example of an angled spacer bar 31 is a bar having an angle of 45 derees. The angled spacer bars 31 may, if desired, be fabricated from the same or different material as the end bars 30. The end cap bar 32 is sized to fit in the top most laminated segment. In this particular discussion the top most laminated segment is 39. The end cap bar 32 serves as a support bar for the top most laminated segment 39. The angled spacer bars 31 and the end bars 30 act in concert to support each of the laminated segments 18 to 29 and 39. Further, the angled spacer bars 31 and the end bars 30 create gap or free space between each of the laminated segments 18 to 29 and 39. This gap allows the cooling gas to freely move between the segments and remove heat from the respective pole.

Figure 3:
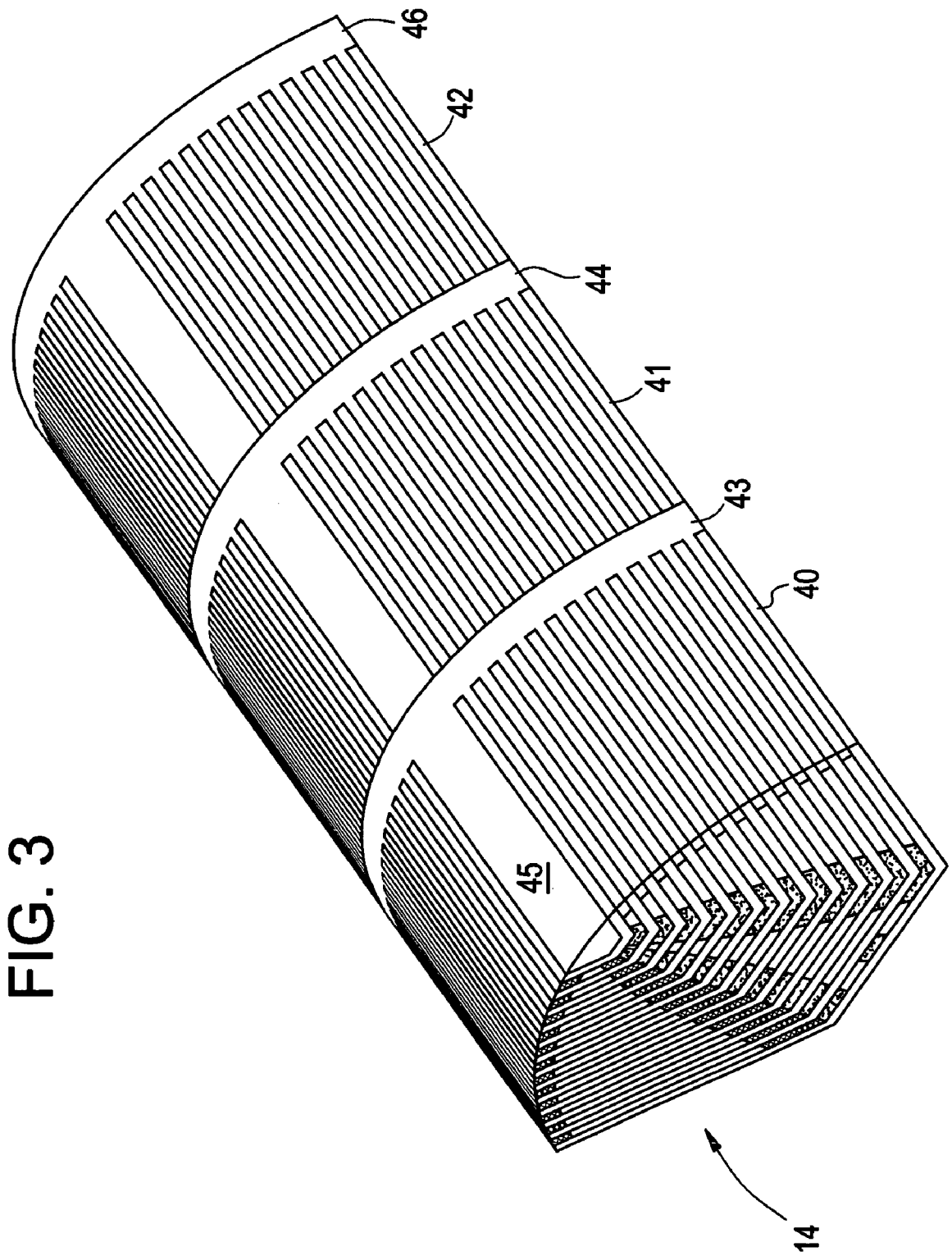
FIG. 3 illustrates a perspective view diagram of a plurality of pole segments of FIG. 2.

Rotor pole 14, FIG. 3 may, if desired, contain three sections 40, 41 and 42. Any number of sections may form rotor pole 14. FIG. 3 illustrates three sections. This is for illustration purposes only and does not limit the disclosed technology. All of the poles 14, 15, 16 and 17 of the synchronous reluctance machine 10 preferably have the same number of sections. For example, if pole 14 had four sections then poles 15, 16 and 17 would have four sections. The rotor pole 14, section 40 is separated from section 41 by an intermediate support disc 43. Section 41 is separated from section 42 by intermediate disc 44. If the number of sections were increased to form any given rotor pole then the number of intermediate discs would increase proportionally. The top surface 45 of the section 40 is rounded and smooth to conform to the inner portion of stator 11.

Each rotor pole 14, 15, 16 and 17 is held in place by an end cap or end flange. The end flange 46 is illustrated in FIG. 3 adjacent to section 42. For any given pole there are only two end flanges that hold laminated segments 18 to 29 and 39, end bars 30, intermediate support discs 43-44 and angled spacer bars 31 in place. The end flange 46 has one surface machined to fit the end portions of the laminated segments 18 to 29 and 39, end bars 30 and angle spacer bars 31. A portion of an individual end flange 46 is affixed to the rotor shaft 59, FIG. 1. In total for each pole 14, 15, 16 and 17 there are two end flanges with a portion of each connected to the rotor shaft 59. All of the poles share round end flanges.

Figure 5:
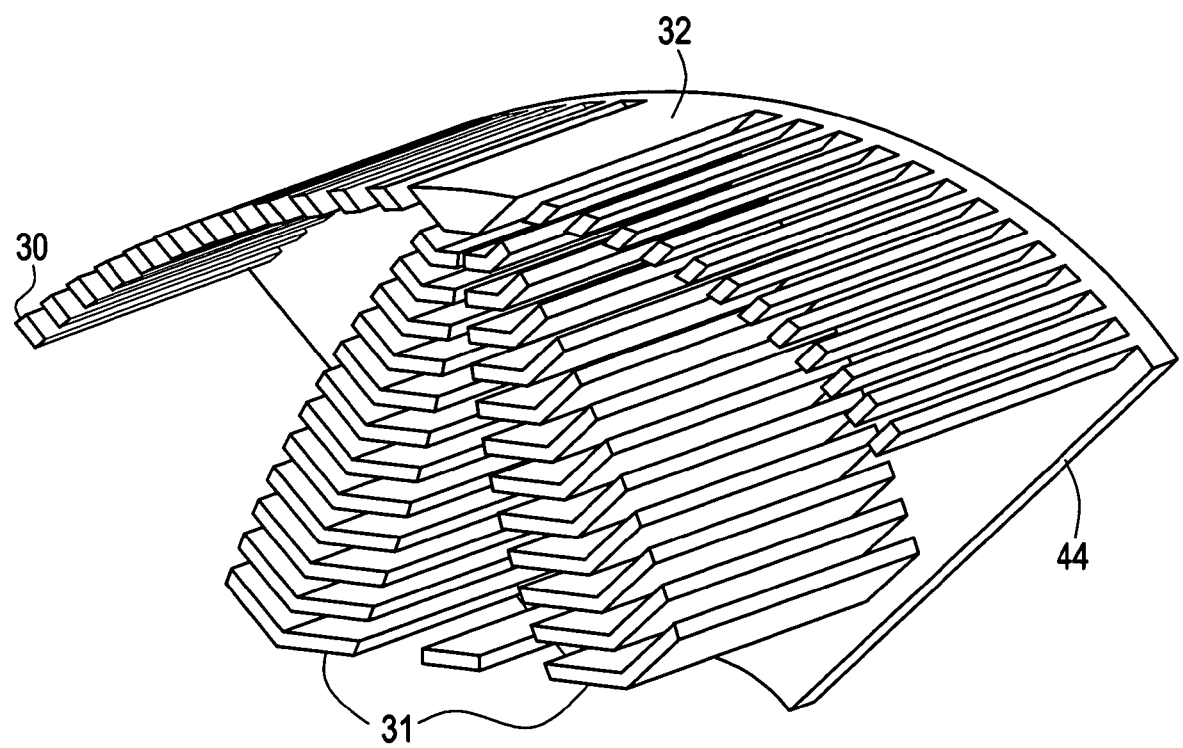
FIG. 5 illustrates a perspective view of an arbitrary length of the support bar structure of FIG. 1.

The network of support bars supports the rotor pole segments radially. The support bars are the end bar 30, angled spacer bar 31, end cap bar 32 and intermediate disc 44. FIG. 5. The support bars, in concert are the support for the laminated segments 18 to 29 and 39 structure and provide a web of open spaces between the laminated segments. The open spaces between the laminated segments are available for the flow of coolant that can be used to regulate the temperature of the rotor in high temperature environments.

Figure 4:
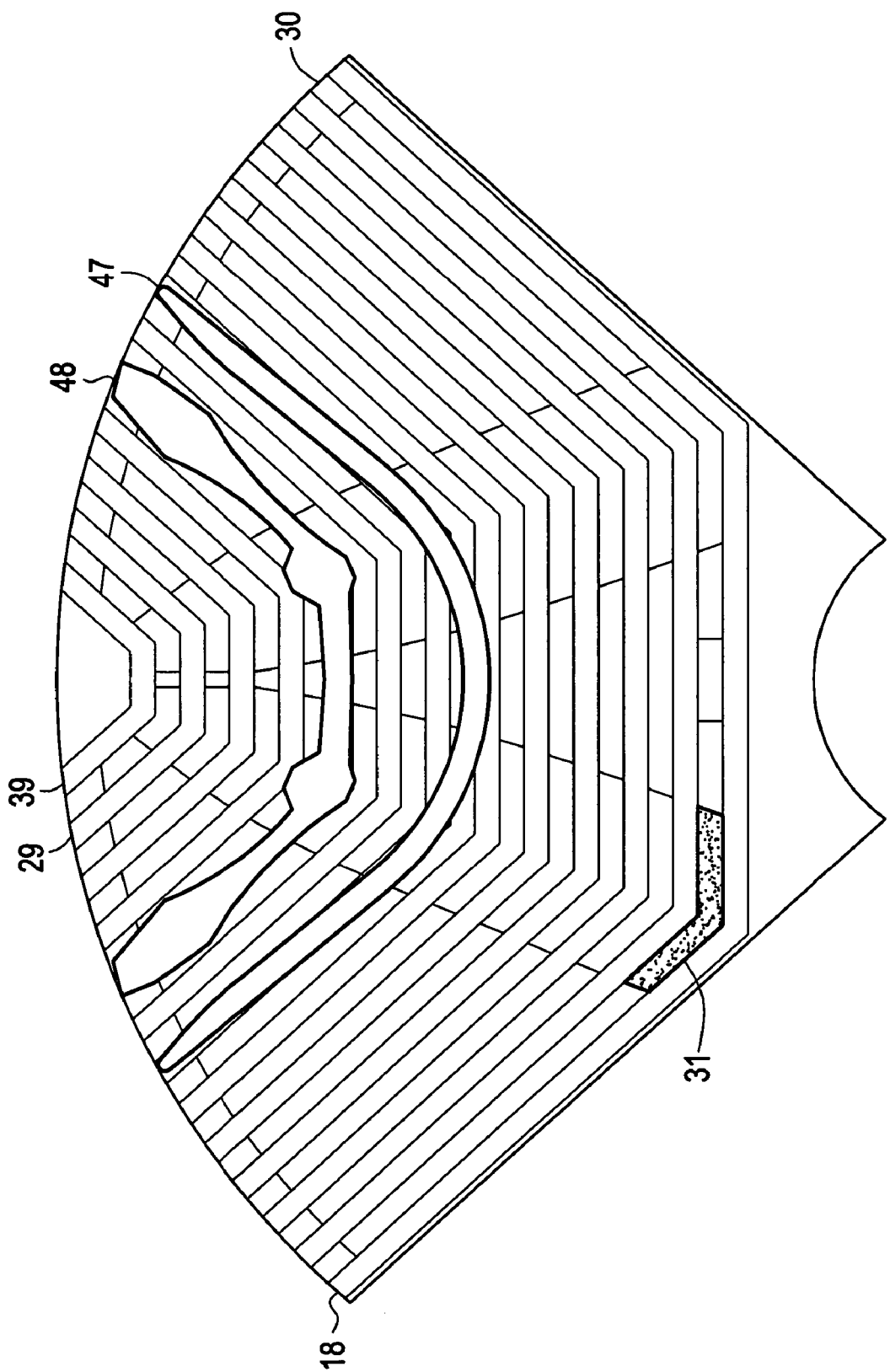
FIG. 4 illustrates an end view diagram of selective planar lamination shapes of a rotor pole.

The boat shaped laminates 18 to 29 and 39, FIG. 4 may, if desired, be any selected number depending on the design criteria for the machine. The spacing between the laminates is controlled by the size of end bar 30. The size and shape of the end bars 30 are selectable depending on the design criteria of the synchronous reluctance machine. The physical geometry of the laminates may, if desired, be selectable. Examples of selectable physical geometries of laminates are near parabolic shaped laminate 47, FIG. 4 and the special shaped laminate 48. The special shaped laminate 48 is substantially boat shaped with the end portions and the bottom portion enlarged. In each case the laminate is designed to meet certain design criteria and the designer of the synchronous reluctance machine 10 may, if desired, mix or match and vary the size of the spacer bars to meet selected design criteria. As the physical geometries of the laminates change so do the size and shape of the end bars 30, intermediate disc 44 and angled spacer bars 31 to accommodate the size and shape of the laminates. The gap between the laminated segments may, if desired, vary to accommodate a larger volume of coolant. If the gap between the laminates changes their associated end bars, intermediate discs 44 and angled spacer bars 31 change accordingly.

As delineated above the synchronous reluctance machine 10 has axially extending radially stacked laminations 18 to 29 and 39, which significantly reduce the core losses. Each of the lamination segments is "locally" supported by end bars 30, intermediate discs 43 and 44, angled spacer blocks 31 and end cap bar 32 so that its mechanical load is not wholly transferred to the next one. This makes the rotor more robust and allows for higher speed and larger diameter designs. Also, intermediate placed discs 43 and 44 support the lamination sections 40, 41 and 42 axially. These bars with the spacing among the lamination segments and the local support structure provide a controlled passage for cooling fluid to remove any rotor losses in a very efficient manner.

In operation: The rotor shaft 59 along with poles 14, 15, 16 and 17 containing the laminated segments 18 to 29 and 39 are rotatively disposed to the rotor which is supported by the inner peripheral surface of the stator 11 casing. Electrical AC power is supplied to the windings of the stator 11 and the rotor begins to rotate. A gas or fluid may, if desired, be forced or non-forced between and around the laminated segments 18 to 29 and 39 thereby cooling the laminated segments.

Figure 6:
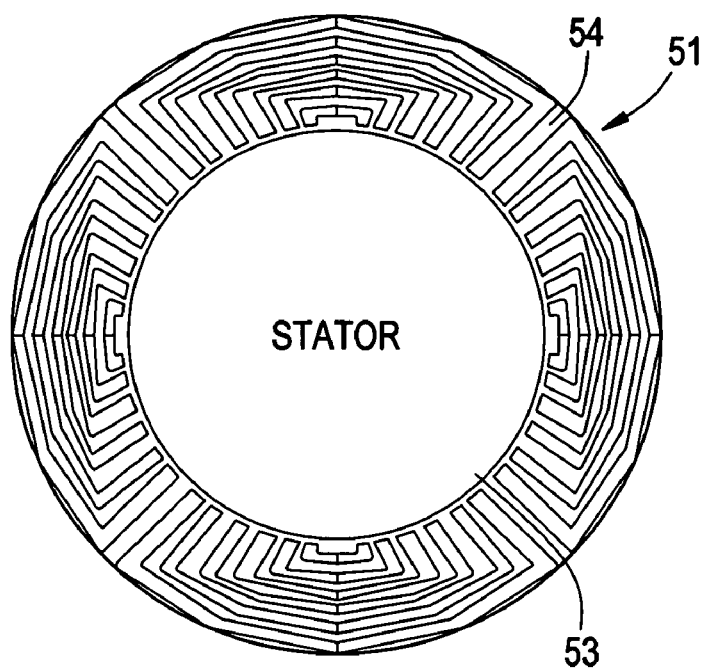
FIG. 6 illustrates an end view of an inside-out synchronous reluctance machine.

An alternate embodiment of the disclosed technology may also take the form commonly referred to as the "inside-out" configuration 51, FIG. 6. In such a configuration, the axially extending laminations may form boat shaped segments radially stacked and the assembly of segments may be located radially outside of the stator 53. The stator 53 may then contain a plurality of windings and slots and may be located inside of the rotor 54.

Figure 7:
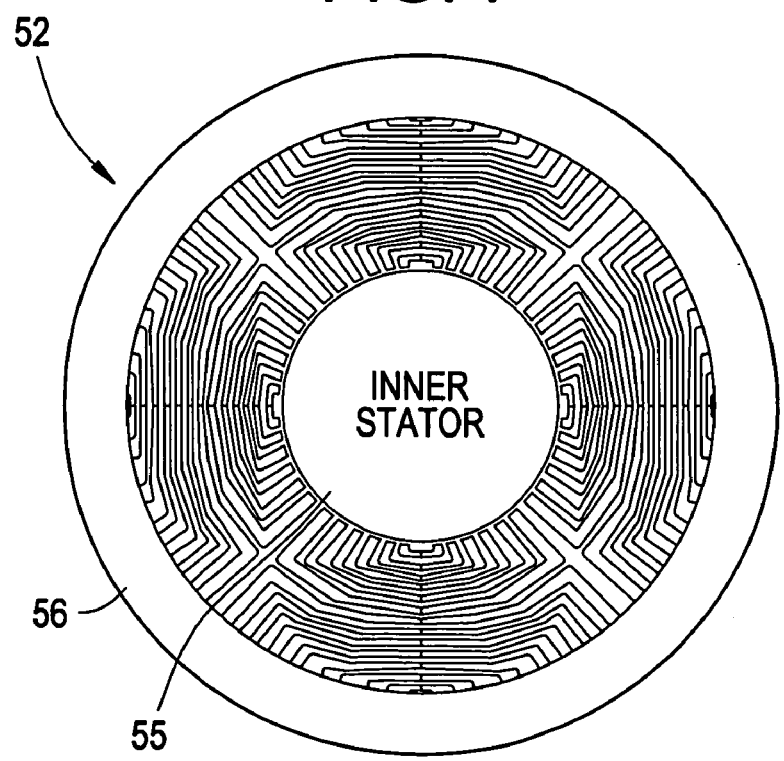
FIG. 7 illustrates an end view of a double-sided synchronous reluctance machine.
Figure 8:
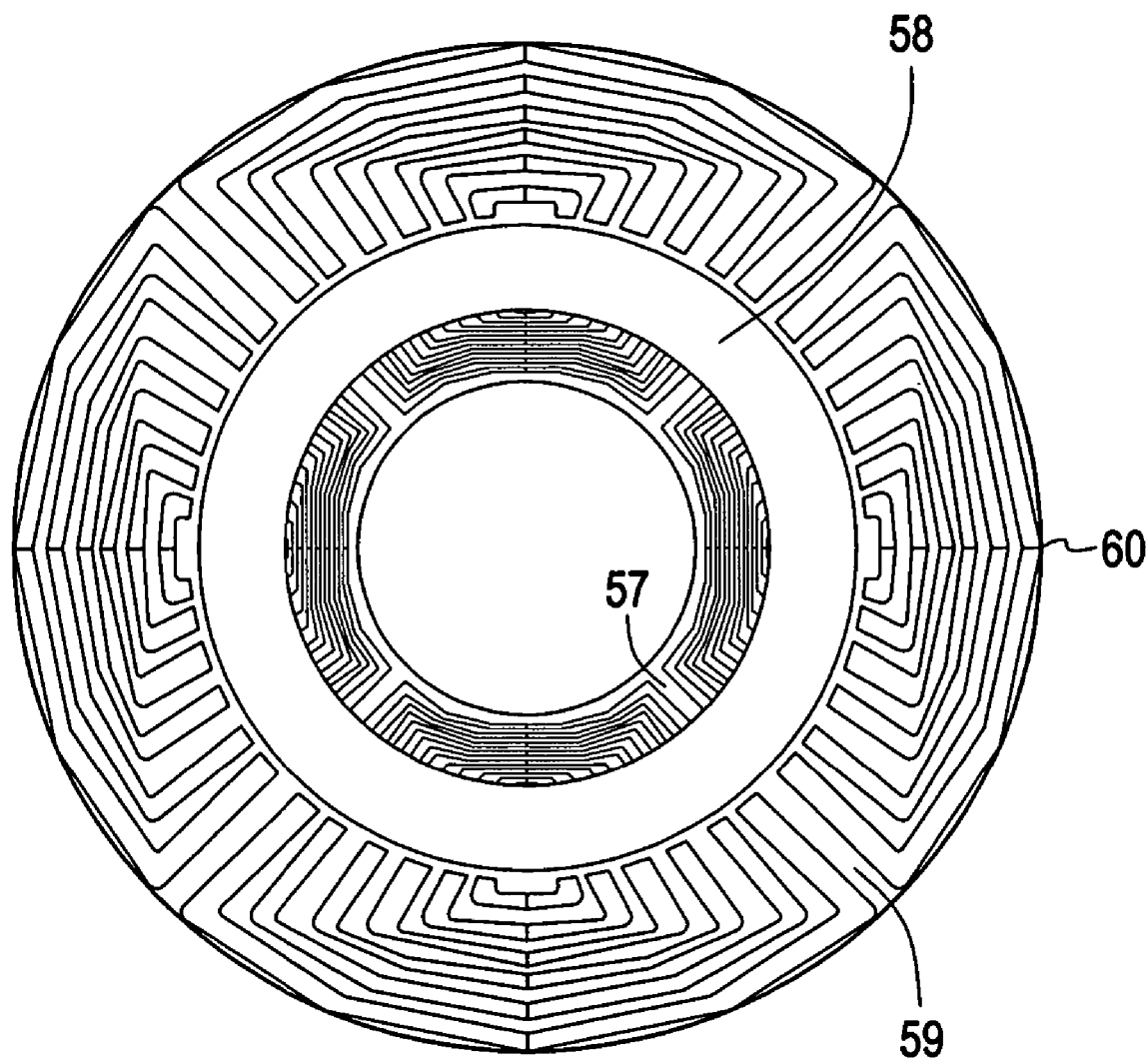
FIG. 8 illustrates an end view of a double-sided synchronous reluctance machine alternate embodiment of FIG. 7.

Another embodiment of the disclosed technology may be applied in such a way that the "inside-out" configuration is used to provide a double-sided machine 52, FIG. 7. The axially stacked laminations 60 can be used to form radially spaced segments that occupy space between an inner 55 and an outer 56 stator assembly. Conversely, a set of lamination segments 57, FIG. 8 may be assembled for rotating a structure radially inside the stator 58 structure while other lamination segments 60 are positioned radially outside the stator 58.

While the disclosed technology has been described with reference to an exemplary embodiment, it will be understood by those skilled in the art that various changes may be made and equivalents may be substituted for elements thereof without departing from the scope of the disclosed technology. In addition, many modifications may be made to adapt a particular situation or material to the teachings of the disclosed technology without departing from the essential scope thereof. Therefore, it is intended that the disclosed technology not be limited to the particular embodiment disclosed as the best mode contemplated for carrying out this disclosed technology, but that the disclosed technology will include all embodiments falling with the scope of the appended claims.

What is claimed is:

1. A synchronous reluctance machine comprising:
a stator;
a rotor shaft operationally disposed within the confines of said stator;
a first plurality of boat shaped segments laminated radially forming a first section of a selected number of rotor poles about said rotor shaft; and
said first section of a selected number of rotor poles supported radially by a network of support bars comprising non-ferromagnetic end bars disposed adjacent to ends of said first plurality of boat shaped segments, the end bars configured solely as support bars.

2. A synchronous reluctance machine as recited in claim 1, wherein said rotor shaft is rotatably supported at an inner peripheral surface of said stator.

3. A synchronous reluctance machine as recited in claim 1, wherein said first plurality of boat shaped segments are radially positioned in an inside-out rotor and stator configuration.

4. A synchronous reluctance machine as recited in claim 1, further comprising second plurality of boat shaped segments laminated radially forming a second section of the selected number of rotor poles about said rotor shaft, wherein said first section and said second section of boat shaped segments are axially stacked.

5. A synchronous reluctance machine as recited in claim 1, wherein said selected boat shaped segments are radially positioned in a double-sided rotor and stator configuration.

6. A synchronous reluctance machine as recited in claim 1, wherein said bars cause a free space between adjacent segments.

7. A synchronous reluctance machine as recited in claim 6, wherein said free space is receiving forced air.

8. A synchronous reluctance machine as recited in claim 7, wherein said forced air is refrigerated.

9. A synchronous reluctance machine as recited in claim 6, wherein said free space is receiving forced gas.

10. A synchronous reluctance machine as recited in claim 9, wherein forced gas is refrigerated.

11. A synchronous reluctance machine having a stator and a rotor shaft operationally disposed therein comprising:
a plurality of selectively shaped laminations forming a selected number of poles about the rotor shaft;
a first end flange having a portion thereof affixed to the rotor shaft;
a second end flange having a portion thereof affixed to the rotor shaft oppositely spaced from said first end flange;
a plurality of non-ferromagnetic intermediate discs axially disposed from one another between said first end and said second end flanges;
said plurality of non-ferromagnetic intermediate discs radially supporting said selectively shaped laminations while preserving a web of open spaces between the selectively shaped laminations; and
said plurality of selectively shaped laminations having end portions thereof connectively disposed to said first and second end flanges.

12. A synchronous reluctance machine as recited in claim 11, wherein said selectively shaped laminations are radially stacked inside of the preceding lamination to form said selected number of poles about the rotor shaft.

13. A synchronous reluctance machine as recited in claim 12, further comprising a plurality of selectively shaped end bars disposed between said stacked selectively shaped laminations.

14. A synchronous reluctance machine as recited in claim 11, wherein said selected shaped laminations are steel.

15. A synchronous reluctance machine as recited in claim 11, wherein said selectively shaped laminations are silicon steel.

16. A synchronous reluctance machine as recited in claim 13, wherein said disposed bars cause a free space between adjacent laminations.

17. A synchronous reluctance machine as recited in claim 16, wherein said free space is receiving forced air.

18. A synchronous reluctance machine as recited in claim 17, wherein said forced air is refrigerated.

* * * * *

UNITED STATES PATENT AND TRADEMARK OFFICE
CERTIFICATE OF CORRECTION

PATENT NO. : 7,489,062 B2  
APPLICATION NO. : 11/272848  
DATED : February 10, 2009  
INVENTOR(S) : Shah et al.

It is certified that error appears in the above-identified patent and that said Letters Patent is hereby corrected as shown below:

On the Face Page, in Field (73), under "Assignee", in Column 1, Line 2, delete "Nishkayuna," and insert -- Niskayuna, --, therefor.

In Column 3, Line 12, delete "derees." and insert -- degrees. --, therefor.

In Column 3, Lines 54-55, delete "disc 44. Fig. 5." and insert -- disc 44 in Fig. 5. --, therefor.

In Column 5, Line 9, in Claim 1, delete "a" and insert -- the --, therefor.

In Column 5, Line 21, in Claim 4, after "comprising" insert -- a --.

Signed and Sealed this

Seventh Day of July, 2009

JOHN DOLL  
*Acting Director of the United States Patent and Trademark Office*